United States Patent
Roper et al.

(10) Patent No.: US 11,680,756 B2
(45) Date of Patent: Jun. 20, 2023

(54) HIERARCHICAL HEAT EXCHANGER MANIFOLD AND HEAT EXCHANGER INCLUDING THE SAME

(71) Applicant: HRL LABORATORIES, LLC, Malibu, CA (US)

(72) Inventors: Christopher Roper, Oak Park, CA (US); John Martin, Malibu, CA (US); Randall Schubert, Santa Monica, CA (US)

(73) Assignee: HRL Laboratories, LLC, Malibu, CA (US)

( * ) Notice: Subject to any disclaimer, the term of this patent is extended or adjusted under 35 U.S.C. 154(b) by 121 days.

(21) Appl. No.: 16/930,203

(22) Filed: Jul. 15, 2020

(65) Prior Publication Data

US 2021/0116188 A1    Apr. 22, 2021

Related U.S. Application Data

(60) Provisional application No. 62/924,031, filed on Oct. 21, 2019.

(51) Int. Cl.
    *F28F 9/02*             (2006.01)

(52) U.S. Cl.
    CPC .......... *F28F 9/0263* (2013.01); *F28F 9/0204* (2013.01); *F28F 9/0268* (2013.01); *F28F 2009/0287* (2013.01); *F28F 2210/02* (2013.01)

(58) Field of Classification Search
    CPC ...... F28F 9/0204; F28F 9/0263; F28F 9/0265; F28F 9/0268; F28F 9/0278; F28F 9/028; F28F 2009/0287; F28F 2210/02
    See application file for complete search history.

(56) References Cited

U.S. PATENT DOCUMENTS

| | | | |
|---|---|---|---|
| 2002/0080563 A1* | 6/2002 | Pence | F28F 9/0275 361/677 |
| 2013/0174924 A1* | 7/2013 | Luo | F28F 9/0278 137/561 A |

(Continued)

FOREIGN PATENT DOCUMENTS

| | | |
|---|---|---|
| EP | 3 217 119 A1 | 9/2017 |
| EP | 3 258 204 A1 | 12/2017 |
| WO | WO 2018/191787 A1 | 10/2018 |

OTHER PUBLICATIONS

International Search Report issued in corresponding International Application No. PCT/US2020/042197, dated Nov. 3, 2020, 12 pages.

*Primary Examiner* — Eric S Ruppert
*Assistant Examiner* — Hans R Weiland
(74) *Attorney, Agent, or Firm* — Lewis Roca Rothgerber Christie LLP

(57) ABSTRACT

A hierarchical heat exchanger manifold includes: first and second fluid passages respectively open to an inlet and an outlet in a first level of the heat exchanger manifold; a plurality of first and second fluid passages in a second level of the heat exchanger manifold; and a plurality of first and second fluid passages in a third level of the heat exchanger manifold. A number of the first fluid passages in the third level is greater than a number of the first fluid passages in the second level. Each of the first fluid passages in the second level is in fluid communication with the inlet and at least one of the first fluid passages in the third level, and each of the second fluid passages in the second level is in fluid communication with the outlet and at least one of the second fluid passages in the third level.

24 Claims, 6 Drawing Sheets

(56) References Cited

U.S. PATENT DOCUMENTS

| | | | |
|---|---|---|---|
| 2013/0206374 A1* | 8/2013 | Roisin | F28F 7/02 |
| | | | 165/165 |
| 2013/0264031 A1 | 10/2013 | Plourde et al. | |
| 2016/0076823 A1* | 3/2016 | Okazaki | F28F 9/0278 |
| | | | 165/174 |
| 2016/0116231 A1* | 4/2016 | Higashiiue | F28F 9/0278 |
| | | | 165/174 |
| 2017/0089643 A1* | 3/2017 | Arafat | F28F 9/0275 |
| 2017/0146305 A1* | 5/2017 | Kuczek | F28F 9/0268 |
| 2020/0041212 A1* | 2/2020 | Palmer | F28F 9/0256 |
| 2021/0071964 A1* | 3/2021 | Ruiz | F28F 9/0268 |
| 2021/0102756 A1* | 4/2021 | Becene | F28F 9/0275 |

\* cited by examiner

HIERARCHICAL HEAT EXCHANGER MANIFOLD AND HEAT EXCHANGER INCLUDING THE SAME

CROSS-REFERENCE TO RELATED APPLICATION

The present application claims priority to and the benefit of U.S. Provisional Patent Application Ser. No. 62/924,031, filed on Oct. 21, 2019 in the United States Patent and Trademark Office, the entire content of which is incorporated herein by reference.

FIELD

One or more aspects of embodiments of the present disclosure relate to a hierarchical heat exchanger manifold and a heat exchanger including the hierarchical heat exchanger manifold.

BACKGROUND

Heat exchangers are devices that transfer heat between two or more fluids, primarily from a warmer (or hotter) fluid to a cooler (or colder) fluid, without physically mixing the two fluids together. Heat exchangers are used in numerous industries, including automotive, aerospace, manufacturing, etc.

Heat exchangers may be air/air-type, where both working fluids are gases, air/liquid-type, liquid/liquid-type, and two phase-type, such as evaporators and condensers. To prevent the fluids from mixing, the different fluids flow in their own passages, referred to herein as "warm fluid passage(s)" and "cool fluid passage(s)." In some instances, only one set of passages (e.g., warm fluid passages) may be defined in a heat exchanger and the other fluid (e.g., the cool fluid) may flow around the passages without being substantially confined, especially when ambient air is the cool fluid. Generally, a pump or fan is used to force the working fluid(s) through the passages of the heat exchanger, although a pump is not required.

There are four general types (or kinds) of heat exchangers: counter flow (or countercurrent), cocurrent flow, crossflow, and hybrids thereof. The different types of heat exchangers are generally defined by the flow direction(s) of the working fluids. For example, in countercurrent heat exchanges, the working fluids flow in opposite directions (e.g., about 180° offset from each other), in cocurrent heat exchanges, the working fluids flow in the same (e.g., parallel) directions, and in crossflow heat exchanges, the working fluids flow perpendicular to each other (e.g., about 90° offset from each other).

Countercurrent heat exchangers allow for the greatest heat transfer between the fluids and is, therefore, generally considered the most efficient type of heat exchanger. For example, a counterflow heat exchangers may be about 30% the size of a comparably-efficient crossflow heat exchanger under certain conditions (e.g., high effectiveness, meaning when transferring a large fraction of the thermodynamic maximum amount possible heat transfer).

However, in countercurrent heat exchangers, it is difficult to evenly distribute the working fluid flows into the respective hot and cold passages, especially when the passages are interlaced and closely-spaced, such as in high-performance plate-fin countercurrent heat exchangers. In view of this difficulty, the hot and cold passages are often rotated by about 90 degrees with respect to each other to simplify the flow distribution, which results in a less-efficient crossflow heat exchanger.

SUMMARY

Aspects of embodiments of the present disclosure are directed toward a hierarchical heat exchanger manifold and a heat exchanger including the hierarchical heat exchanger manifold. The heat exchanger may be a counterflow heat exchanger. The hierarchical heat exchanger manifold has a hierarchical arrangement of a plurality of levels. Each level has smaller flow passages than the preceding level and may have more flow passages than the preceding level. In some embodiments, the flow passages in one level extend perpendicularly to (e.g., extend to cross) the flow passages of the preceding and subsequent levels. In some embodiments, both warm and cool fluid flow passages are arranged in each level. In such embodiments, warm fluid flow passages may extend under one or more cool fluid flow passages in a preceding level, and the warm fluid flow passages may be separated from the one or more cool fluid flow passages by blocking portions to prevent or protect the warm and cool fluids from mixing while allowing for heat transfer between the working fluids in the manifold, thereby increasing the overall heat transfer efficiency of the heat exchanger.

According to an embodiment of the present disclosure, a hierarchical heat exchanger manifold includes: a first fluid passage open to an inlet and a second fluid passage open to an outlet in a first level of the heat exchanger manifold; a plurality of first fluid passages and a plurality of second fluid passages in a second level of the heat exchanger manifold; and a plurality of first fluid passages and a plurality of second fluid passages in a third level of the heat exchanger manifold. A number of the first fluid passages in the third level is greater than a number of the first fluid passages in the second level. Each of the first fluid passages in the second level is in fluid communication with the inlet and at least one of the first fluid passages in the third level, and each of the second fluid passages in the second level is in fluid communication with the outlet and at least one of the second fluid passages in the third level.

Each of the first fluid passages in the second level may be in fluid communication with the inlet via the first fluid passage in first level, and each of the second fluid passages in the second level may be in fluid communication with the outlet via the second fluid passage in the first level.

The hierarchical heat exchanger manifold may further include a plurality of first fluid passages and a plurality of second fluid passages in a fourth level of the heat exchanger manifold. A number of the first fluid passages in the fourth level may be greater than the number of the first fluid passages in the third level, and a number of the second fluid passages in the fourth level may be greater than the number of the second fluid passages in the third level.

Each of the first fluid passages in the third level may be in fluid communication with at least one of the first fluid passages in the fourth level, and each of the second fluid passages in the third level may be in fluid communication with at least one of the second fluid passages in the fourth level.

The first fluid passages in the second level may be greater in number than the first fluid passage in the first level.

The first fluid passage in the first level may extend in a first direction, and the first fluid passages in the second level may extend in a second direction. The second direction may cross the first direction.

The first direction and the second direction may be perpendicular to each other.

The first fluid passages in the third level may extend in the first direction.

Each of the first fluid passages in the second level may extend under the first fluid passage in the first level.

A transition between the first fluid passage in the first level and the first fluid passages in the second level may have a saddle shape.

Each of the second fluid passages in the third level may extend under each of the first fluid passages in the second level.

The hierarchical heat exchanger manifold may further include blocking portions physically separating the second fluid passages in the second level from the first fluid passages in the third level.

The first fluid passages in the second level may be interleaved with the second fluid passages in the second level.

According to another embodiment of the present disclosure, a heat exchanger includes: a plurality of hierarchical manifolds, each of the manifolds including: an inlet; an outlet; a plurality of first fluid passages in fluid communication with the inlet, at least two of the first fluid passages being arranged at each of a plurality of levels, the at least two first fluid passages in a lower one of the levels having a smaller cross-sectional area than the at least two first fluid passages in an upper one of the levels; and a plurality of second fluid passages in fluid communication with the outlet, at least two of the second fluid passages being arranged at each of the levels; and a heat exchanger core including a plurality of first flow passages and a plurality of second flow passages. The first fluid passages in the upper one of the levels extend at an angle with respect to the first fluid passages in the lower one of the levels, and the second fluid passages in the upper one of the levels extend at an angle with respect to the second fluid passages in the lower one of the levels. The number of the first fluid passages in the lower one of the levels corresponds to a number of the first flow passages in the core, and the number of the second fluid passages in the lower one of the levels corresponds to a number of the second flow passages in the core.

A number of the first fluid passages in the upper one of the levels may be less than a number of the first fluid passages in the lower one of the levels, and a number of the second fluid passages in the upper one of the levels may be less than a number of the second fluid passages in the lower one of the levels.

Each of the first fluid passages in the lower one of the levels may be in fluid communication with each of the first fluid passages in the upper one of the levels.

The first fluid passages in the upper one of the levels may extend parallel to each in a first direction, and the first fluid passages in the lower one of the levels may extend parallel to each other in a second direction, the second direction crossing the first direction.

The first direction may be perpendicular to the second direction.

The upper one of the levels may be arranged above the lower one of the levels in a third direction, and the third direction may be perpendicular to both the first and second directions.

According to another embodiment of the present disclosure, a counterflow heat exchanger includes: a first hierarchical manifold being arranged in a plurality of levels and including: an inlet and an outlet at a first level; a plurality of first flow channels at a second level, the first flow channels being open to the inlet and sealed from the outlet; and a plurality of first flow channels at a third level, the first flow channels at the third level being open to each of the first flow channels at the second level; a second hierarchical manifold; and a counterflow core arranged between and in fluid communication with the first hierarchical manifold and the second hierarchical manifold in a first direction. The counterflow core includes a plurality of first flow passages in fluid communication with the inlet via the first flow channels in the second and third levels and a plurality of second flow passages in fluid communication with the outlet via the second flow channels in the second and third levels. The first and second flow passages alternate with each other in a second direction and a third direction, and the second and third directions are perpendicular to each other and perpendicular to the first direction. A number of the first flow channels at the third level is greater than the number of the first flow channels at the second level and is less than a number of the first flow passages in the core.

The first flow channels in the second level may extend in a direction perpendicular to extension direction of the first flow channels in the third level.

The first hierarchical manifold may further include: a plurality of second flow channels at the second level; and a plurality of second flow channels at the third level. The second flow channels may be open to the outlet and sealed from the inlet, and the second flow channels in the third level may be open to each of the second flow channels in the second level.

The second flow channels in the third level may extend under each of the first flow channels in the second level.

The first hierarchical manifold may further include a plurality of first flow channels at a fourth level. The first flow channels at the fourth level may be open to each of the first flow channels at the third level and may be respectively open to ones of the first flow passages in the counterflow core.

BRIEF DESCRIPTION OF THE DRAWINGS

These and other aspects and features of the present disclosure will be further appreciated and better understood with reference to the specification, claims, and appended drawings, in which:

DETAILED DESCRIPTION

Figure 1:
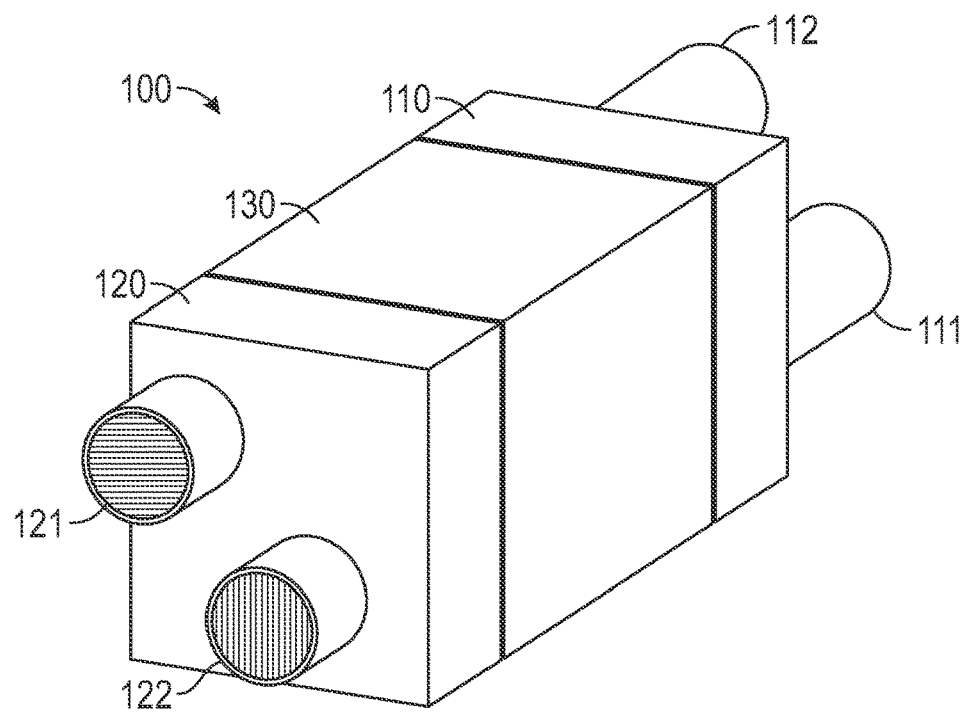
FIG. 1 is a perspective view of a counterflow heat exchanger according to an embodiment of the present disclosure.

The detailed description set forth below, in connection with the appended drawings, is intended as a description of example embodiments of the present disclosure and is not intended to represent the only forms in which the present disclosure may be embodied. The description sets forth aspects and features of the present disclosure in connection with the illustrated example embodiments. It is to be understood, however, that the same or equivalent aspects and features may be accomplished by different embodiments, and such other embodiments are encompassed within the spirit and scope of the present disclosure. As noted elsewhere herein, like reference numerals in the description and the drawings are intended to indicate like elements. Further, descriptions of features, configurations, and/or other aspects within each embodiment should typically be considered as available for other similar features, configurations, and/or aspects in other embodiments.

FIG. 1 shows a counterflow heat exchanger 100 according to an embodiment of the present disclosure. The heat exchanger 100 includes a first manifold 110, a second manifold 120, and a core 130 between and in fluid communication with the first and second manifolds 110/120.

The first manifold 110 includes a warm fluid inlet 111 and a cool fluid outlet 112, and the second manifold 120 includes a cool fluid inlet 121 and a warm fluid outlet 122. Here, reference to "warm" and "cool" is only for ease of explanation, and terms can be replaced by "first" and "second" without affecting the disclosure. The inlets 111/121 and outlets 112/122 may each include a flange, threaded opening, barbed connection, welded joint, etc. for fluid connection to a fluid handling system (e.g., an air conditioning system, a turbocharging system, etc.).

In FIG. 1, the inlets 111/121 and outlets 112/122 are shown as protruding (e.g., extending) from the respective manifolds 110/120 in a direction parallel to the flow direction of the fluids through the core 130 (e.g., parallel to a longitudinal direction of the heat exchanger 100, represented by the x-direction), but the present disclosure is not limited thereto. For example, in the embodiment shown in FIG. 4, the inlets 311/321 and the outlets 312/322 protrude (e.g., extend) from the respective manifolds 310/320 in a direction perpendicular to the flow direction of the fluids through the core 330 (e.g., the z-direction). Other suitable arrangements of the inlets and the outlets in the manifolds are contemplated, such an inlets and outlets extending at a 45° angle with respect to the flow direction of the fluids through the core or inlets and outlets protruding (e.g., extending) from the manifolds in the y-direction. In other embodiments, the inlets and the outlets may extend in different suitable directions from each other (e.g., the +x direction and the −x direction, etc.). The inlets and outlets (e.g., the size, location, protruding direction, etc. of the inlets and outlets) may be suitably varied to meet space requirements in a desired application (e.g., may be suitably designed to fit into a predetermined space).

The manifolds 110/120 act to organize and direct the fluid flow into and from the respective passages (or channels) in the core 130. As discussed above, because the warm and cool fluids do not mix in the heat exchanger 100, at least some amount of a fluid impermeable barrier, such as a solid material, is provided between adjacent warm and cool fluid passages.

The heat exchanger 100 may be formed of (or may include) a metal, a polymer, ceramics, and/or composites. Examples of the metal include aluminum, an aluminum alloy, copper, a copper alloy, an iron alloy, steel, stainless steel, Inconel, a nickel superalloy, refractory alloys (e.g., tungsten, niobium, molybdenum, zirconium, hafnium, etc.), a titanium alloy, a magnesium alloy, a Monel alloy, an Invar alloy, bronze, a brass alloy, precious metal alloys (silver, palladium, platinum, gold, etc.), a cobalt alloy, combinations of two of more of these elements and/or compounds. In one embodiment, the heat exchanger 100 is formed of an aluminum alloy, such as 77A7. Examples of the polymer include thermoplastics, such as polyamide, polyetherimide (e.g., Ultem), ABS, polycarbonate, polypropylene, etc., and thermosets, such as epoxies, (meth)acrylates, thiol-enes, urethanes, etc. Examples of the ceramics include silicon oxycarbide (SiOC), silicon carbide (SiC), alumina, zirconia, mullite, silicon oxynitride (SiON), silicon nitride (e.g., $Si_3N_4$), etc. and ceramic composites, such as ceramic/ceramic composites (e.g., C/SiOC, alumina/SiOC, Ox/Ox, and SiC/SiC) and ceramic/metal composites (e.g., Zr/SiOC and Ni/SiOC).

The heat exchanger 100 may be manufactured by a suitable additive manufacturing process (e.g., 3D printing). In some embodiments, the manifolds 110/120 may be manufactured by utilizing an additive manufacturing process while the core 130 is manufacturing by using other conventional manufacturing processes, such as stamping and brazing, etc. In an embodiment in which the core is manufactured separately from the manifolds, the manifolds and core may be connected to each other by brazing, soldering, welding (e.g., stick, wire, MIG, TIG, laser, e-beam, ultrasonic, friction, etc.), adhesive bonding, compressed gasket, etc.

Some examples of the additive manufacturing process include vat polymerization (e.g., stereolithography; digital light processing; scan, spin, and selectively photocure; continuous liquid interface production), powder bed fusion (e.g., selective laser sintering, direct metal laser sintering, selective laser melting, selective heat sintering, multi-jet fusion), binder jetting (e.g., 3DP, ExOne, VoxelJet, desktop metal), material jetting (e.g., Polyjet, Smooth Curvatures Printing, Multijet Modeling, Projet), sheet lamination (e.g., laminated object manufacture, selective deposition lamination, ultrasonic additive manufacturing), material extrusion (e.g., fused filament fabrication, fused deposition modeling, direct ink write), directed energy deposition (e.g., laser metal deposition, laser energy net shaping, direct metal depositions, laser engineered net shaping), hybrids of multiple additive manufacturing methods, and/or hybrids of additive and subtractive manufacturing methods. Subtractive manufacturing may refer to, as some examples, machining or computer numerical control (CNC) machining.

Figure 2:
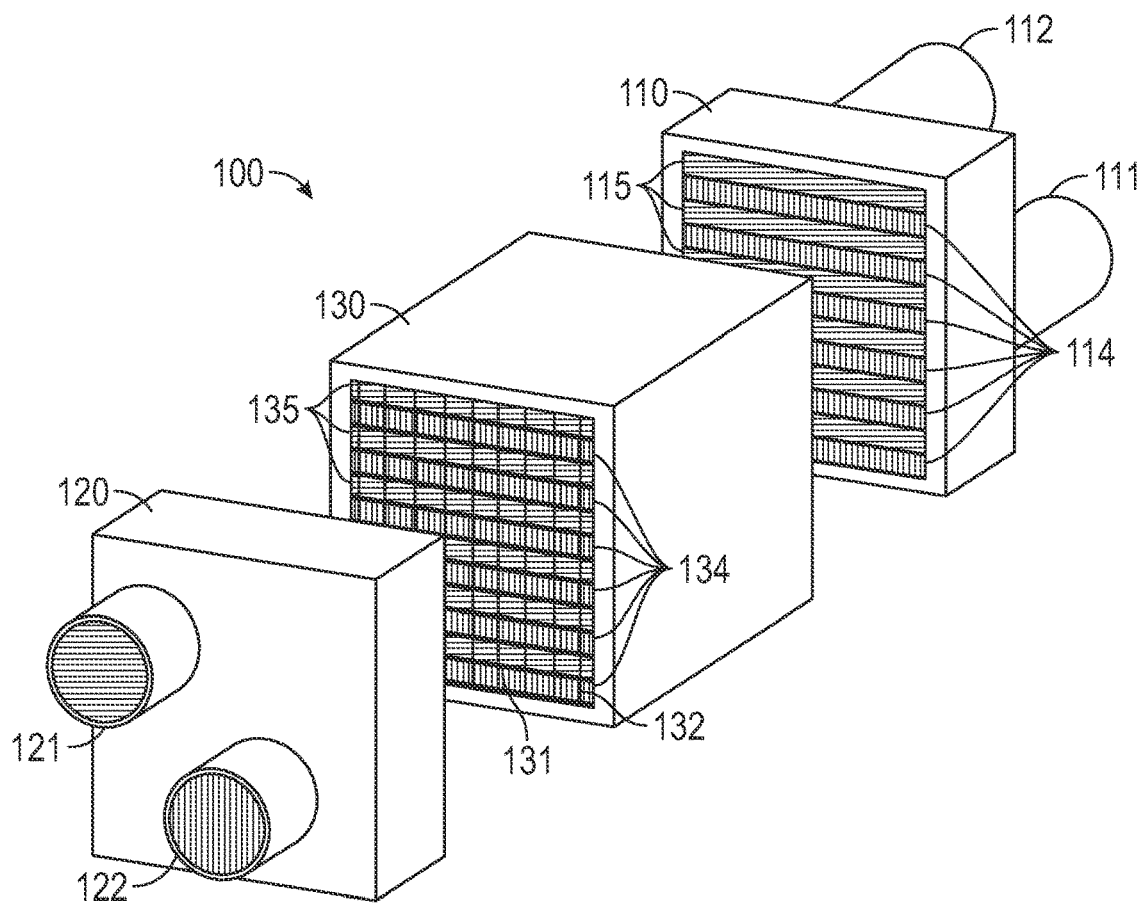
FIG. 2 is an exploded perspective view of the counterflow heat exchanger shown in FIG. 1 according to an embodiment of the present disclosure.

FIG. 2 is an exploded perspective view of the heat exchanger 100 shown in FIG. 1 according to an embodiment of the present disclosure. The core 130 is shown as being a plate-fin type (kind) core including a plurality of plates 131 and fins 132, but the present disclosure is not limited thereto. In other embodiments, the core 130 may be a shell-and-tube type (kind), finned tube type (kind), plate-frame type (kind), plate-fin type (kind), or a hybrid of these types (kinds). That is, the present disclosure is applicable to various suitable types (kinds) of heat exchanger cores.

The plates 131 are arranged between and separate alternating layers of warm fluid passages 134 and cool fluid passages 135, and the fins 132 extend vertically or at an angle with respect to the plates 131 (e.g., at a 45-60 degree angle) in each of the warm and cool fluid passages 134/135. In some embodiments, the warm and cool fluid passages 134/135 may not immediately alternate. For example, in some embodiments, there may be two directly adjacent warm fluid passages 134 between two cool fluid passages 135, etc.

The fins 132 in each flow layer may be formed from a single sheet of material, such as a metal, by folding the sheet to have a shape, such as a square-wave shape or sine-wave shape, and the folded fins 132 may be bonded to (e.g., welded, brazed, adhered, etc.) to one or both of the adjacent plates 131 (e.g., may be bonded to only one of the adjacent plates 131 or may be bonded to both an upper plate 131 and a lower plate 131). However, the shape of the fins 132 is not particularly limited and may be, for example, straight fins, offset fins, wavy fins, pin fins, and/or louvered fins. In other embodiments, a plurality of separate U-shaped fins or a plurality of flat plates may be arranged in each flow layer and bonded to one or both of the adjacent plates 131.

The first and second manifolds 110/120 direct the warm and cool fluid flows from the inlets 111/121 to the respective warm and cool fluid passages 134/135 in the core 130 and then the other of the first and second manifolds 110/120 collect the warm and cool fluid flows from the core 130 and coalesce the respective warm and cool fluid flows into the outlets 112/122. Thus, each of the first and second manifolds 110/120 acts to direct (e.g., separate) one inlet fluid flows and acts to coalesce the other fluid flow for supply to the outlet.

In FIGS. 1-4, the different fluid flows (i.e., the warm and cool fluid flows) are indicated by different shading lines. These lines are intended to indicate the different fluid flows and not to indicate any structural element or component.

Utilizing the warm fluid flow as an example, because there is a greater number of warm fluid passages 134 in the core 130 than number of warm fluid inlets 111 and warm fluid outlets 122, the first manifold 110 directs (e.g., separates) the inlet flow of the warm fluid to each of the warm fluid passages 134 in the core 130, and the second manifold 120 gathers (or combines, merges, or coalesces) the warm fluid from each of the warm fluid passages 134 in the core 130 after the warm fluid has passed through the core 130 to the warm fluid outlet 122. The same operations occur with the cool fluid flow, with the second manifold 120 directing the inlet flow of the cool fluid to the cool fluid passages 135 in the core 130 and the first manifold 110 gathering the cool fluid from each of the cool fluid passages 135 in the core 130 after the cool fluid has passed through the core 130 to the cool fluid outlet 112. While the illustrated manifolds 110/120 have only a single inlet and a single outlet for each of the warm and cool fluids, the present disclosure is not limited thereto. In other embodiments, each manifold may include a plurality of inlets and outlets and/or inlets and outlets for more than two fluids. Throughout this disclosure, the "warm" fluid flow and "cool" fluid flow refer to the relative temperatures of the inlet fluids such that, in some cases, the "warm" fluid may be cooler than the "cool" fluid at the respective outlets.

As will be described below in more detail, each of the first and second manifolds 110/120 includes a hierarchical structure including a plurality of levels in which the inlet flow is progressively separated into increasingly smaller flow passages at each level until a final level is reached which has a flow layer structure corresponding to the core 130 and the outlet flow is progressively merged into increasingly large flow passages at each level until a first (or initial) level is reached which opens to the outlet. For example, referring to FIG. 2, the final level of the first manifold 110 is shown, and the warm and cool flow passages 114/115 (e.g., warm and cool fluid layers) correspond to (e.g., have the same number and arrangement as) the warm and cool flow passages 134/135 in the core 130.

Figure 3:
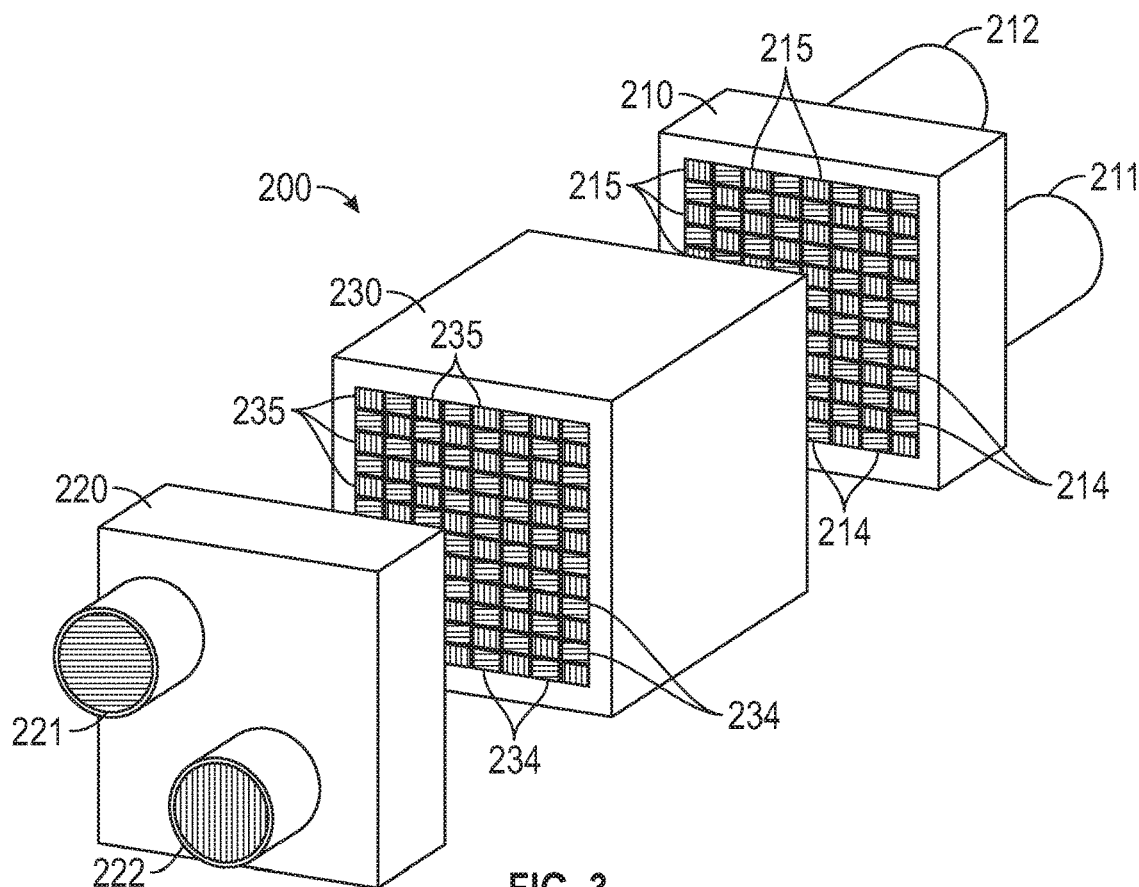
FIG. 3 is an exploded perspective view of the counterflow heat exchanger shown in FIG. 1 according to another embodiment of the present disclosure.

FIG. 3 is an exploded perspective view of a counterflow heat exchanger 200 according to another embodiment. Elements, components, and the outer appearance of the heat exchanger 200 shown in FIG. 3 are similar to the similarly numbered elements and components in the heat exchanger 100 shown in FIGS. 1 and 2. As such, repeated descriptions of similar or the same features and elements of the heat exchanger 200 may not be provided again.

Different from the heat exchanger 100 shown in FIGS. 1 and 2, in the heat exchanger 200 shown in FIG. 3, the warm and cool fluid passages alternate not only between layers but also alternate within the same layer (e.g., the warm and cool fluid passages may be interleaved within each layer).

For example, referring to FIG. 3, the core 230 includes warm fluid passages 234 and cool fluid passages 235. Within each layer of the core 230, with the layers being considered as stacked on each other in a vertical direction (e.g., the z-direction) of FIG. 3 for convenience of explanation, the warm and cool fluid passages 234/235 alternate with each other (e.g., alternate with each other in both the vertical direction and a horizontal direction, for example, in both the z- and y-directions). Similarly, as will be described in more detail below, the final level of the manifolds 210/220 include warm and cool fluid passages 214/215 that correspond to the warm and cool fluid passages 234/235 in the core 230.

Unlike the core 130 shown in FIG. 2, the core 230 shown in FIG. 3 may be manufactured as an all-prime heat exchanger using, for example, additive manufacturing or the like. Different from plate/fin cores, such as the core 130, the core 230 may include solid materials with lower thermal conductivity used for the walls while not reducing heat transfer as much as if such materials were used in a plate/fin core, which requires high thermal conductivity fins for high fin efficiency.

Figure 4:
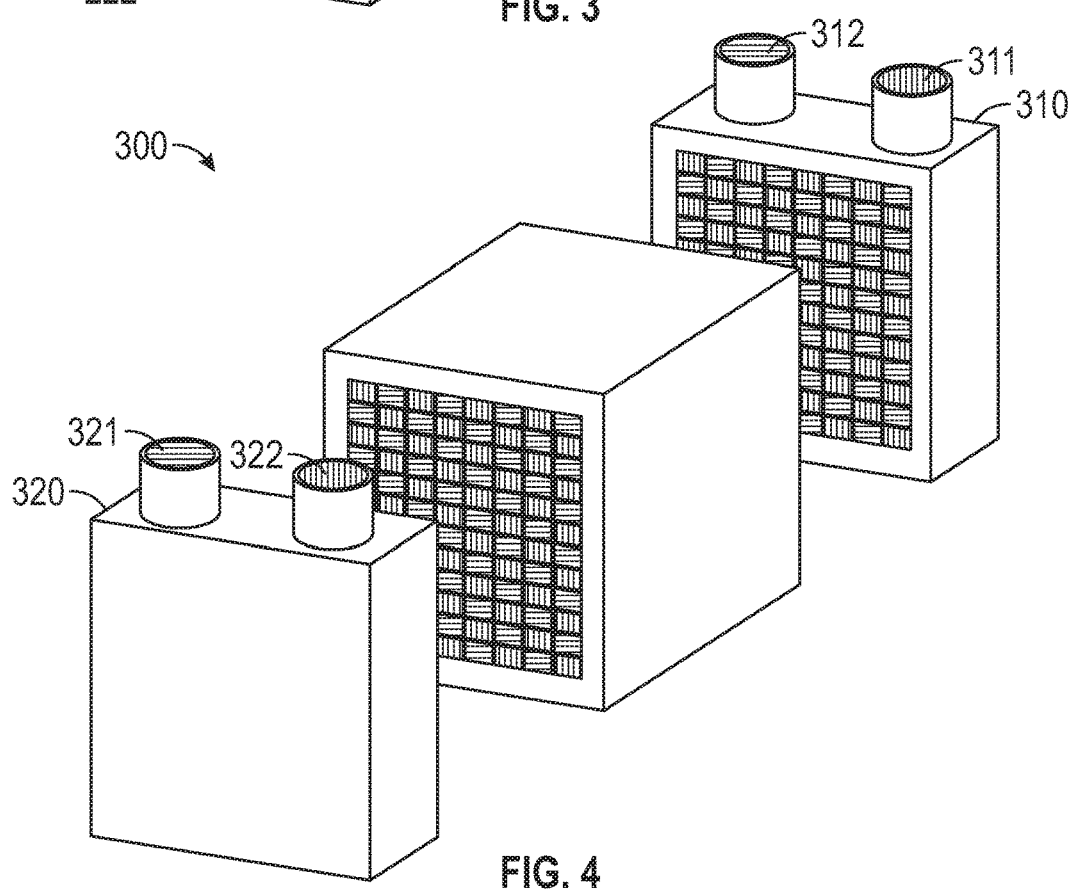
FIG. 4 is an exploded perspective view of the counterflow heat exchanger shown in FIG. 3 but with vertical inlets and outlets.

FIG. 4 shows an exploded perspective view of a counterflow heat exchanger 300 according to an embodiment. The heat exchanger 300 is substantially similar to the heat exchanger 200 shown in FIG. 3 except for the location of the inlets and outlets in the manifolds. For example, the heat exchanger 300 includes a first manifold 310, a second manifold 320, and a core 330 between the first and second manifolds 310/320. Different from the first and second manifolds 110/120/210/220 described above, the inlets 311/321 and outlets 312/322 protrude (or extend) vertically from an upper surface of the manifolds 310/320 in a direction perpendicular to the fluid flow direction through the core 330 (e.g., the z-direction). The arrangement of the inlets and outlets on the first and second manifolds shown in FIG. 4 is applicable to any of the other embodiments of heat exchangers described herein.

Figure 5A:
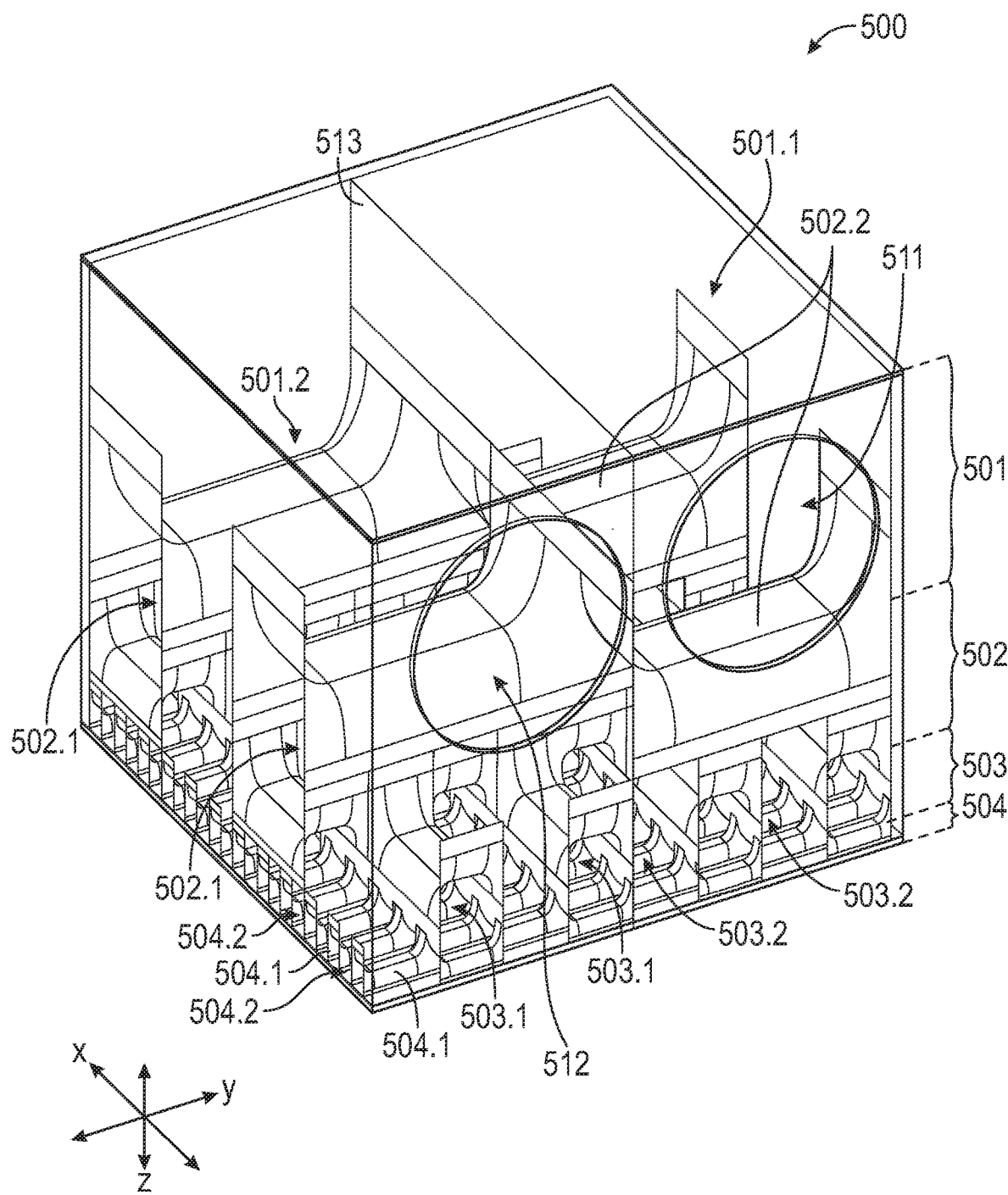
FIGS. 5A-5C are partial cut-away views of a heat exchanger manifold according to an embodiment of the present disclosure.
Figure 5B:
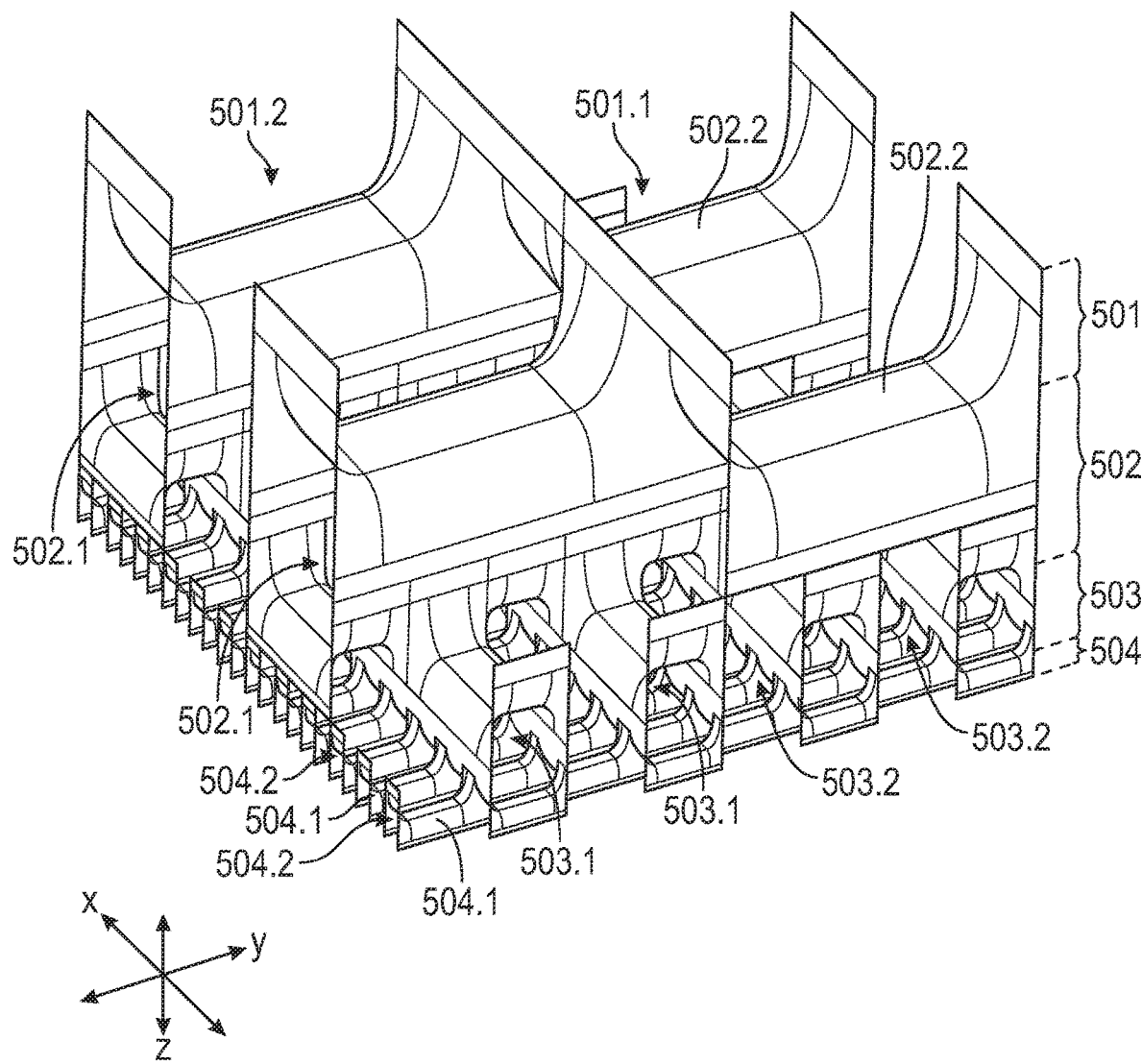
Figure 5C:
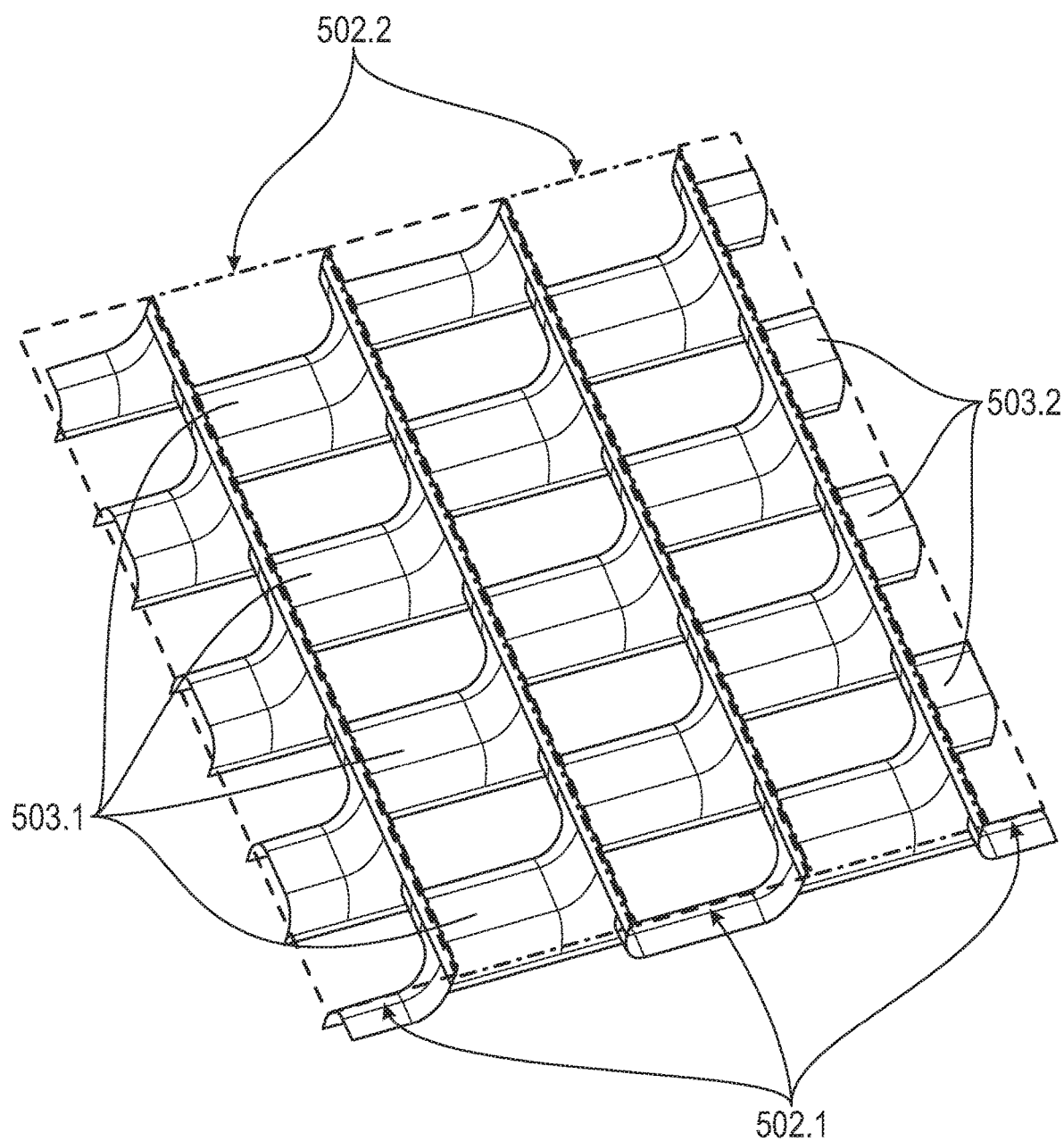

FIG. 5A is a partial cut-away view of a manifold (e.g., a heat exchanger manifold or counterflow heat exchanger manifold) 500 according to an embodiment of the present disclosure with the outer housing in line form, FIG. 5B is same view as shown in FIG. 5A with the outer housing omitted for clarity, and FIG. 5C is a top-down cut-away view showing a single level of the manifold 500. The manifold 500 includes an inlet 511 and an outlet 512 in a sidewall thereof and a partition wall 513 separating the inlet 511 and the outlet 512 from each other. As described above, the warm and cool fluids do not mix (e.g., do not physically contact each other) in the heat exchanger; thus, fluid impermeable barriers exist between each interaction of warm and cool fluids. The fluid impermeable barriers allow for heat transfer between the warm and cool fluids but prevent mixing of the warm and cool fluids.

The manifold 500 includes a plurality of fluid passages arranged in a plurality of hierarchical levels (e.g., levels that are stacked on each other) 501-504. The manifold 500 is shown as having first-fourth levels 501/502/503/504, but the present disclosure is not limited thereto. In other embodiments, the manifold 500 may have more or fewer levels depending on a core design and/or space requirements, etc.

The first level 501 of the manifold 500 may be open to the inlet 511 and outlet 512 and may include two open spaces (e.g., two collection volumes). The first level 501 may be considered as having two fluid passages (or two fluid reservoirs), a first fluid passage (or first fluid reservoir) 501.1 in fluid communication with the inlet 511, and a second fluid passage (or second fluid reservoir) 501.2 in fluid communication with the outlet 512.

As will be described below, each level of the manifold 500 includes the same number or more fluid passages than the preceding level. The number of fluid passages in the levels in the following example embodiments are used as examples to explain the aspects and features of the present invention. As such, the number of fluid passages in each level as described below are merely examples and may be suitably varied.

The second level 502 of the manifold 500 may be in fluid communication with the first level 501 above it and the third level 503 below it. The second level 502 may include four (or more) fluid passages 502.1/502.2, including two first fluid passages 502.1 and two second fluid passages 502.2. The first fluid passages 502.1 are in fluid communication with the first fluid passage 501.1 in the first level 501 (e.g., are in fluid communication with the inlet 511), and the second fluid passages 502.2 are in fluid communication with the second fluid passage 501.2 in the first level 501 (e.g., are in fluid communication with the outlet 512). The first fluid passages 502.1 may extend perpendicularly to (or may extend to cross) the outlet 512 flow direction (e.g., may extend in the y-direction) and may extend under the inlet 511. Similarly, the second fluid passages 502.2 may extend perpendicularly to (or may extend to cross) the inlet 511 flow direction (e.g., may extend in the y-direction) and may extend under the outlet 512. In this way, heat may be transferred between the warm and cool fluids in the manifold 500, increasing the overall heat transfer efficiency of the heat exchanger by improve heat transfer in the manifold 500.

Further, the first fluid passages 502.1 and the second fluid passages 502.2 may be interlaced with each other. For example, the first fluid passages 502.1 may be between two adjacent ones of the second fluid passages 502.2 (e.g., in the x-direction). In the second level 502, for example, ones of the first fluid passages 502.1 are alternatively arranged with ones of the second fluid passages 502.2 in the x-direction. The first and second fluid passages in each of the levels (described further below) except the first level 501 are similarly interlaced with each other within each level.

In some embodiments, the inlet 511 and the outlet 512 may be arranged in different levels from each other. For example, one or more inlets 511 may be arranged in the first level 501, and one or more outlets 512 may be arranged in the second level 502.

The third level 503 of the manifold 500 may be in fluid communication with the second level 502 above it and the fourth level 504 below it. The third level 503 may include eight fluid passages 503.1/503.2, four first fluid passages 503.1 and four second fluid passages 503.2. Each of the fluid passages 503.1/503.2 in the third level 503 may be about half the size of each of the fluid passages 502.1/502.2 in the second level 502. Each of the first fluid passages 503.1 may be in fluid communication with all (or some or one) of the first fluid passages 502.1, and each of the second fluid passages 503.2 may be in fluid communication with all (or some or one) of the second fluid passages 502.2, thereby improving flow conditions and reducing a pressure drop between the levels. In other embodiments, each of the first fluid passages 503.1 may be in fluid communication with only some or, in some cases, only one, of the first fluid passages 502.1, with the second fluid passages 503.2 having the same or similar configuration.

The fluid passages 503.1/503.2 in the third level 503 may be below and may extend in a direction perpendicular to the extension direction of the fluid passages 502.1/502.2 in the second level 502 (e.g., may extend in the z-direction). By alternating the fluid passage directions between the levels, the manifold 500 may be made more compact. Further, the contact surface area between the warm and cool fluids is increased in the manifold 500, allowing for improved heat transfer in the manifold 500.

FIG. 5C is a cut-away cross-sectional view of the manifold 500 taken through the second level 502 showing the third level 503. In FIG. 5C, the fluid passages 502.1/502.2 in the second level 502 are shown by the dotted lines, while the fluid passages 503.1/503.2 in the third level are visible.

The fourth level (e.g., the final level) 504 of the manifold 500 may be in fluid communication with the third level 503 above it and the core below it. The fourth level 504 may include twenty-four fluid passages 504.1/504.2, twelve first fluid passages 504.1 and twelve second fluid passages 504.2. Each of the fluid passages 504.1/504.2 in the fourth level 504 may be about half the size of each of the fluid passages 503.1/503.2 in the third level 503. However, because there are more fluid passages in the fourth level 504 than in the third level 503, thereby reducing (or minimizing) any change between levels of the total cross-sectional flow area, a pressure drop in the fluids between the levels is reduced and flow is improved. Further, each of the first fluid passages 504.1 may be open to all (or some or one) of the first fluid passages 503.1, and each of the second fluid passages 504.2 may be open to all (or some or one) of the second fluid passages 503.2, thereby improving flow distribution.

While the manifold 500 is described has having four levels 501-504, the present disclosure is not limited thereto. In other embodiments, a manifold may include more than four levels, such as eight or more, or twenty or more. The number of levels is not limited and may be selected based on overall size constraints.

The outlet arrangement of the fluid passages 504.1/504.2 in the fourth level 504 corresponds to the fluid passage arrangement in a core. Thus, the manifold 500, across a plurality of levels, separates the single inlet flow into a plurality of individual flows to correspond to a countercurrent heat exchanger core. Similarly, the manifold 500 receives a plurality of individual fluid flows from the heat exchanger core and, across the plurality of levels, and coalesces the fluid into a single outlet flow. Each increasing level 501-504 of the manifold 500 may have smaller fluid passages and/or more fluid passages to separate (or coalesce in the case of the outlet) the fluid flow.

The junctions between the fluid passages of the adjacent levels may be formed to avoid sharp corners to avoid mechanical stress concentrations and to provide gradual transitions in cross-sectional areas to reduce pressure drop. For example, in the manifold 500, the junctions are formed as saddle-shaped structures, but the present disclosure is not limited to this shape.

The fluid passages may have a surface roughness (Ra) of less than about 100 µm (e.g., less than about 10 µm or less than about 1 µm). In some embodiments, the manifold may be post-processed after manufacturing to achieve these surface roughness values. Examples of such post-processing include chemical machining, electrochemical machining, sand blasting, vibratory polishing, controlled flow of abrasive media through passages, and/or combinations thereof. In some embodiments, additional (e.g., secondary) post-processing may occur, examples of which include anodization, conversion coating, painting, etc. These processes may also improve corrosion performance and/or surface character (e.g., surface energy to promote or enhance condensation or boiling heat transfer) of the material of manifold.

In some embodiments, the manifold 500 may be manufactured in its individual levels 501-504, and the levels 501-504 may then be joined together to form the manifold 500. The various levels 501-504 may be welded or otherwise bonded to each other. It is further contemplated that each level 501-504 could be manufactured as individual fluid passages and then bonded together.

Figure 6:
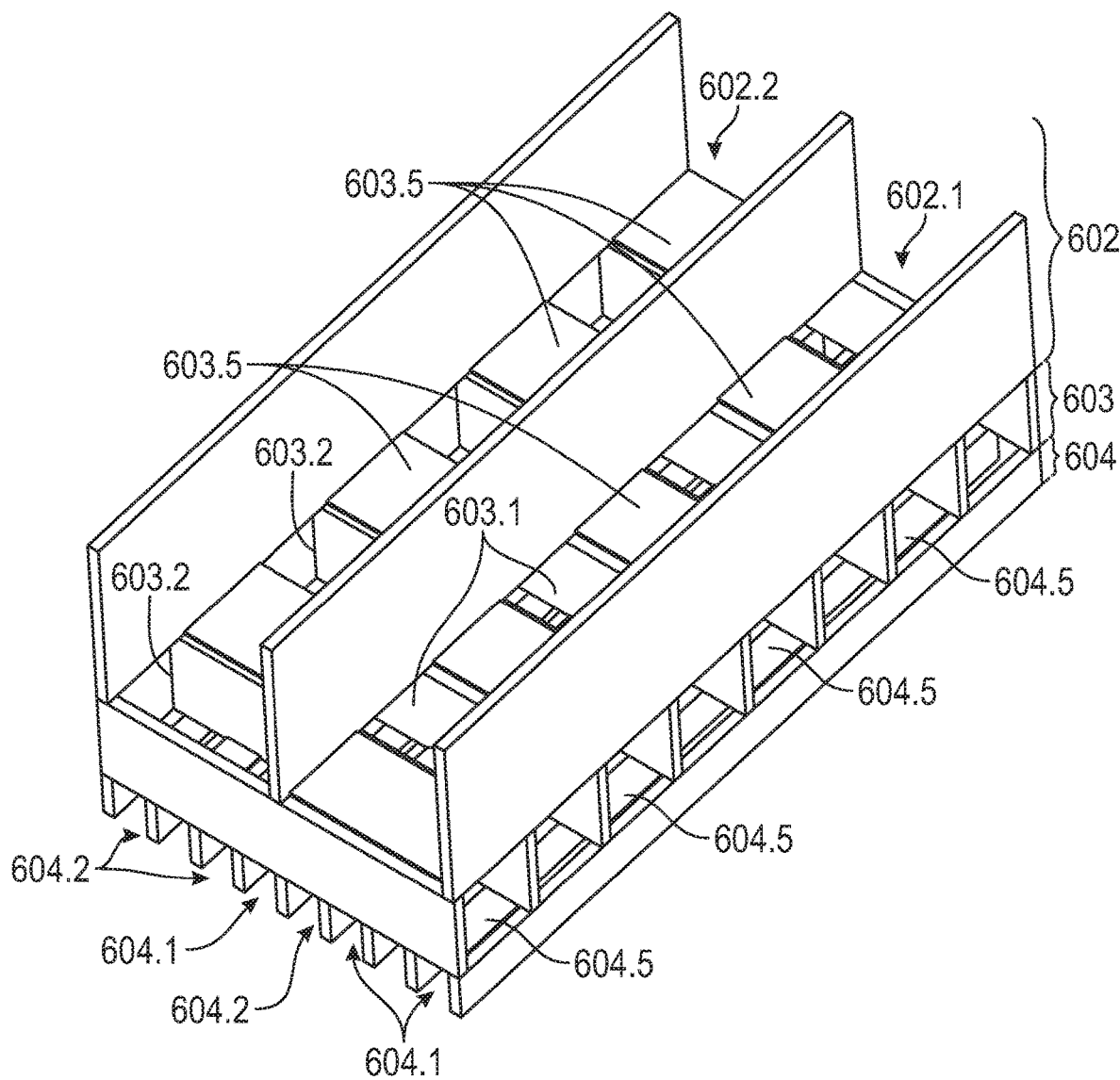
FIG. 6 is a schematic representation of fluid flow passages in a heat exchanger manifold according to an embodiment of the present disclosure.

Referring to FIG. 6, a portion of three levels 602-604 of a manifold are schematically shown. Different from the manifold 500 shown in FIGS. 5A and 5B, the saddle-shaped junctions between flow passages, along with the inlet and outlet, are omitted in FIG. 6 for ease of explanation.

The first level 602 may include two fluid passages 602.1/602.2, a first fluid passage 602.1 and a second fluid passage 602.2, extending in a first direction (e.g., the y-direction) and adjacent with each other in a second direction crossing (e.g., perpendicular to) the first direction (e.g., the z-direction). The first and second fluid s passages 602.1/602.2 may be (or may extend) parallel with each other.

The second level 603 be below the first level 602 in a second direction (e.g., the x-direction) and may include eight fluid passages 603.1/603.2, four first fluid passages 603.1 and four second fluid passages 603.2. The first and second fluid passages 603.1/603.2 may alternate with each along the first direction, and each of the fluid passages 603.1/603.2 may extend in the second direction. Each of the fluid passages 603.1/603.2 may pass under both of the fluid passages 602.1/602.2 of the first level 602, but blocking portions 603.5 prevent (or protect from) fluid mixing. For example, an upper surface of the first fluid passages 603.1 under the first fluid passage 602.1 is open to allow fluid communication therebetween while the upper surface of the first fluid passages 603.1 under the second fluid passage 602.2 is sealed with a blocking portion 603.5 to prevent (or protect from) fluid mixing. Thus, even though the first fluid passages 603.1 travel under the second fluid passage 602.2, the different fluids within these passages do not mix while heat transfer occurs through the blocking portions and sidewalls thereof. Similarly, the second fluid passages 603.2 are open to the second fluid passage 602.2 while blocking portions 603.5 are present between the second fluid passages 603.2 and the first fluid passage 602.1 to prevent (or protect from) fluid mixing.

The third level 604 may be below the second level 603 in the third direction and may include eight fluid passages 604.1/604.2, four first fluid passages 604.1 and four second fluid passages 604.2. The first and second fluid passages 604.1/604.2 may alternate with each other in the second direction and may extend in the first direction. The first fluid passages 604.1 are open to the first fluid passages 603.1 in the second level 603 and are blocked (e.g., sealed) from the second fluid passages 603.2 in the second level 603 by blocking portions 604.5. Thus, even though the first fluid passages 604.1 extend under all of the second fluid passages 603.2 in the preceding level, the different fluids do not mix due to the blocking portions 604.5. Similarly, the second fluid passages 604.2 are open to the second fluid passages 603.2 and are blocked (e.g., sealed) from the first fluid passages 603.1 by the blocking portions 604.5.

The different fluids within the same level do not mix because each fluid passage has sidewalls separating each other.

According to embodiments, contact surface area between the different fluids is substantially increased in the manifold while reducing or minimizing pressure drop by iteratively separating (or coalescing) the fluid flows across the different layers. In this manner, a single inlet fluid flow (or a smaller number of inlet fluid flows) is efficiently separated into a greater number of smaller size (e.g., smaller cross-sectional area) fluid flows for entry into a counterflow heat exchanger core, and a plurality of smaller size fluid flows from the heat exchanger are efficiently coalesced into a single (or smaller number of) outlet fluid flow(s).

It will be understood that, although the terms "first", "second", "third", etc., may be used herein to describe various elements, components, regions, layers, levels, and/or sections, these elements, components, regions, layers, levels, and/or sections should not be limited by these terms. These terms are only used to distinguish one element, component, region, layer, level, or section from another element, component, region, layer, level, or section. Thus, a first element, component, region, layer, level, or section discussed below could be termed a second element, component, region, layer, level, or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" means a component constituting at least half, by weight, of a composition, and the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the terms "exemplary" and "example" are intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although example embodiments of a hierarchical heat exchanger manifold and a heat exchanger including the hierarchical heat exchanger manifold have been described and illustrated herein, many modifications and variations within those embodiments will be apparent to those skilled in the art. Accordingly, it is to be understood that a hierarchical heat exchanger manifold and a heat exchanger including the hierarchical heat exchanger manifold according to the present disclosure may be embodied in forms other than as described herein without departing from the spirit and scope of the present disclosure. The present disclosure is defined by the following claims and equivalents thereof.

What is claimed is:

1. A hierarchical heat exchanger manifold comprising:
   a first fluid passage open to an inlet and a second fluid passage open to an outlet in a first level of the heat exchanger manifold;
   a plurality of first fluid passages and a plurality of second fluid passages in a second level of the heat exchanger manifold; and
   a plurality of first fluid passages and a plurality of second fluid passages in a third level of the heat exchanger manifold, a number of the first fluid passages in the third level being greater than a number of the first fluid passages in the second level,
   wherein each of the first fluid passages in the second level is in fluid communication with the inlet and at least one of the first fluid passages in the third level,
   wherein each of the second fluid passages in the second level is in fluid communication with the outlet and at least one of the second fluid passages in the third level, and
   wherein at least two of the first fluid passages in the third level open to at least one of the first fluid passages in the second level at different areas spaced apart from each other in a primary extension direction of the first fluid passage in the second level and at an area between a proximal and distal end of the first fluid passage in the second level in the primary extension direction of the first fluid passage in the second level.

2. The hierarchical heat exchanger manifold of claim 1, wherein each of the first fluid passages in the second level is in fluid communication with the inlet via the first fluid passage in first level, and
   wherein each of the second fluid passages in the second level is in fluid communication with the outlet via the second fluid passage in the first level.

3. The hierarchical heat exchanger manifold of claim 1, further comprising a plurality of first fluid passages and a plurality of second fluid passages in a fourth level of the heat exchanger manifold,
   wherein a number of the first fluid passages in the fourth level is greater than the number of the first fluid passages in the third level, and
   wherein a number of the second fluid passages in the fourth level is greater than the number of the second fluid passages in the third level.

4. The hierarchical heat exchanger manifold of claim 3, wherein each of the first fluid passages in the third level is in fluid communication with at least one of the first fluid passages in the fourth level, and
   wherein each of the second fluid passages in the third level is in fluid communication with at least one of the second fluid passages in the fourth level.

5. The hierarchical heat exchanger manifold of claim 1, wherein the first fluid passages in the second level are greater in number than the first fluid passage in the first level.

6. The hierarchical heat exchanger manifold of claim 1, wherein the first fluid passage in the first level extends in a first direction, and
   wherein the first fluid passages in the second level extend in a second direction, the second direction crossing the first direction.

7. The hierarchical heat exchanger manifold of claim 6, wherein the first direction and the second direction are perpendicular to each other.

8. The hierarchical heat exchanger manifold of claim 7, wherein the first fluid passages in the third level extend in the first direction.

9. The hierarchical heat exchanger manifold of claim 6, wherein each of the first fluid passages in the second level extend under the first fluid passage in the first level.

10. The hierarchical heat exchanger manifold of claim 9, wherein a transition between the first fluid passage in the first level and the first fluid passages in the second level has a saddle shape.

11. The hierarchical heat exchanger manifold of claim 9, wherein each of the second fluid passages in the third level extends under each of the first fluid passages in the second level.

12. The hierarchical heat exchanger manifold of claim 11, further comprising blocking portions physically separating the second fluid passages in the second level from the first fluid passages in the third level.

13. The hierarchical heat exchanger manifold of claim 1, wherein the first fluid passages in the second level are interleaved with the second fluid passages in the second level.

14. A heat exchanger comprising:
a plurality of the hierarchical heat exchanger manifolds of claim 1; and
a heat exchanger core comprising a plurality of first flow passages and a plurality of second flow passages,
wherein the first fluid passages in the second level of a first one of the hierarchical heat exchanger manifolds extend perpendicularly to the first fluid passages in the third level of the first one of the hierarchical heat exchanger manifolds,
wherein the second fluid passages in the second level of the first one of the hierarchical heat exchanger manifolds extend at an angle with respect to the second fluid passages in the third level of the first one of the hierarchical heat exchanger manifolds,
wherein the number of the first fluid passages in the third level of the first one of the hierarchical heat exchanger manifolds corresponds to a number of the first flow passages in the core, and
wherein the number of the second fluid passages in the third level of the first one of the hierarchical heat exchanger manifolds corresponds to a number of the second flow passages in the core.

15. The heat exchanger of claim 14, wherein a number of the first fluid passages in the second level of the first one of the hierarchical heat exchanger manifolds being less than a number of the first fluid passages in the third level of the first one of the hierarchical heat exchanger manifolds, and
wherein a number of the second fluid passages in the second level of the first one of the hierarchical heat exchanger manifolds being less than a number of the second fluid passages in the third level of the first one of the hierarchical heat exchanger manifolds.

16. The heat exchanger of claim 15, wherein each of the first fluid passages in the third level of the first one of the hierarchical heat exchanger manifolds is in fluid communication with each of the first fluid passages in the second level of the first one of the hierarchical heat exchanger manifolds.

17. The heat exchanger of claim 16, wherein the first fluid passages in the second level of the first one of the hierarchical heat exchanger manifolds extend parallel to each other in a first direction, and
wherein the first fluid passages in the third level of the first one of the hierarchical heat exchanger manifolds extend parallel to each other in a second direction, the second direction crossing the first direction.

18. The heat exchanger of claim 17, wherein the first direction is perpendicular to the second direction.

19. The heat exchanger of claim 18, wherein the second level is arranged above the third level in a third direction, the third direction being perpendicular to both the first and second directions.

20. A counterflow heat exchanger comprising:
a first hierarchical manifold being arranged in a plurality of levels and comprising:
an inlet and an outlet at a first level;
a plurality of first flow channels at a second level, the first flow channels being open to the inlet and sealed from the outlet; and
a plurality of first flow channels at a third level, each of the first flow channels at the third level directly opening to each of the first flow channels at the second level;
a second hierarchical manifold; and
a counterflow core arranged between and in fluid communication with the first hierarchical manifold and the second hierarchical manifold in a first direction,
wherein the counterflow core comprises a plurality of first flow passages in fluid communication with the inlet via the first flow channels in the second and third levels and a plurality of second flow passages in fluid communication with the outlet via the second flow channels in the second and third levels, the first and second flow passages alternating with each other in a second direction and a third direction, the second and third directions being perpendicular to each other and perpendicular to the first direction, and
wherein a number of the first flow channels at the third level is greater than the number of the first flow channels at the second level and is less than a number of the first flow passages in the core.

21. The counterflow heat exchanger of claim 20, wherein the first flow channels in the second level extend in a direction perpendicular to an extension direction of the first flow channels in the third level.

22. The counterflow heat exchanger of claim 21, wherein the first hierarchical manifold further comprises:
a plurality of second flow channels at the second level, the second flow channels being open to the outlet and sealed from the inlet; and
a plurality of second flow channels at the third level, the second flow channels in the third level being open to each of the second flow channels in the second level.

23. The counterflow heat exchanger of claim 22, wherein the second flow channels in the third level extend under each of the first flow channels in the second level.

24. The counterflow heat exchanger of claim 23, wherein the first hierarchical manifold further comprises a plurality of first flow channels at a fourth level, the first flow channels at the fourth level being open to each of the first flow channels at the third level and respectively open to ones of the first flow passages in the counterflow core.

* * * * *